No. 630,966. Patented Aug. 15, 1899.
L. K. BÖHM.
CARBID FURNACE.
(Application filed June 15, 1896. Renewed May 25, 1898.)
(No Model.)
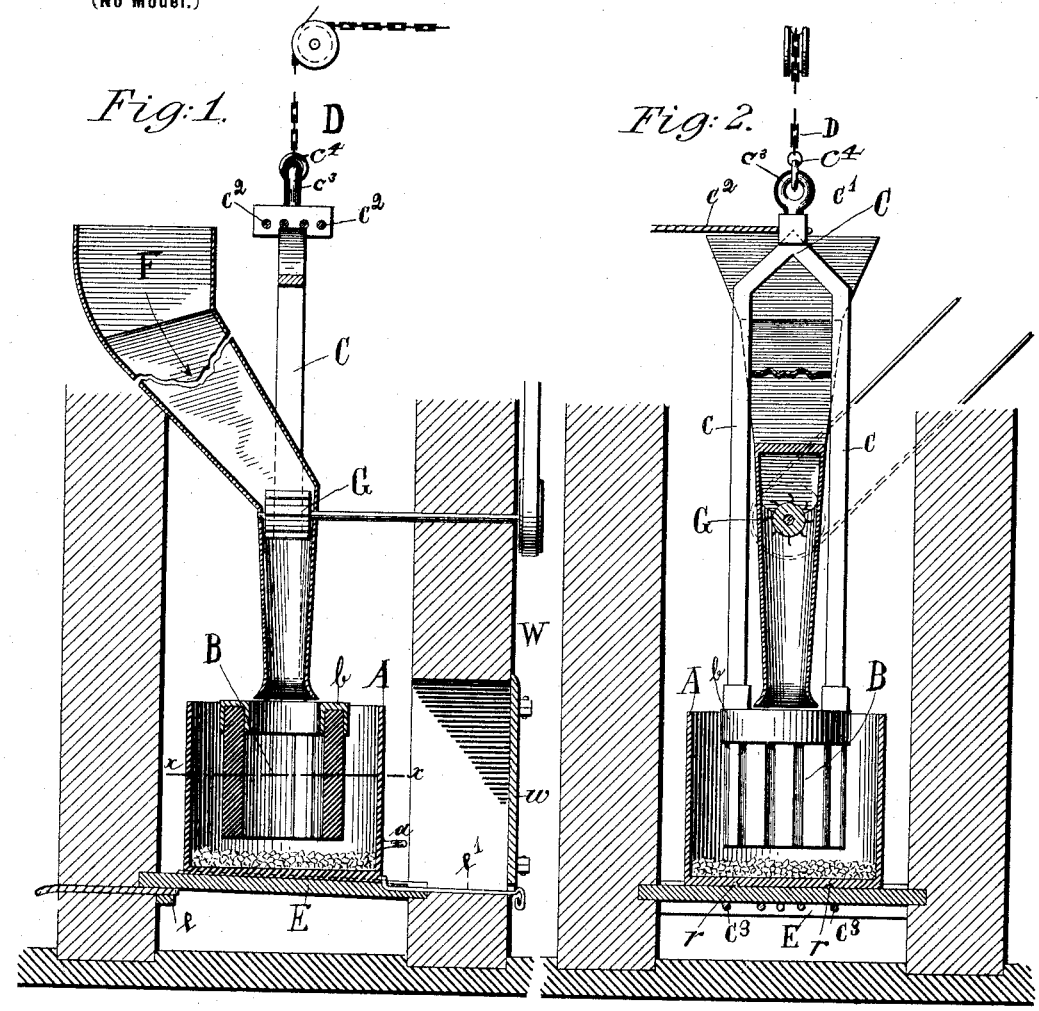
WITNESSES:
INVENTOR
Ludwig K. Böhm.

UNITED STATES PATENT OFFICE.

LUDWIG K. BÖHM, OF NEW YORK, N. Y., ASSIGNOR TO THE ELECTRO GAS COMPANY, OF WEST VIRGINIA.

CARBID-FURNACE.

SPECIFICATION forming part of Letters Patent No. 630,966, dated August 15, 1899.

Application filed June 15, 1896. Renewed May 25, 1898. Serial No. 681,756. (No model.)

*To all whom it may concern:*

Be it known that I, LUDWIG K. BÖHM, a subject of the Emperor of Germany, residing at New York, in the county and State of New York, have invented certain new and useful Improvements in Carbid-Furnaces, of which the following is a specification.

My invention relates to a carbid-furnace in which carbids are made from metal oxids and carbon by the action of the electrical current, and is especially intended for the production of carbid of calcium from a mixture of calcium oxid and powdered carbon.

It is the special object of my invention to provide a carbid-furnace of high efficiency by virtue of its special arrangement of the carbons forming the upper electrode. Further, a pure product is obtained, free of uncombined carbon, because the end of the lower electrode is formed of carbid. By means of my novel arrangement I attain that, practically, none of the mixture of calcium oxid and powdered carbon passes through the furnace without being combined.

The invention is illustrated in the accompanying drawings, in which—

Figure 1 is a vertical section of the essential parts of the electrical furnace. Fig. 2 is a side view of Fig. 1. Fig. 3 is a top plan of Fig. 1 on line $xx$. Figs. 4 and 5 are top plan views of modifications of the carbon arrangement, and Fig. 6 is a sectional view of Fig. 4 on the line $yy$.

The electrical furnace consists, essentially, of the iron vessel A, in which the carbid is formed, the carbon arrangement B, which forms the upper electrode, the device C, to which is attached the carbon arrangement and which is raised or lowered, with the carbons attached thereto, by the chain D, the iron plate E, which forms part of the lower electrode, the hopper F, through which the mixture of carbon and calcium oxid is introduced, and the wheel G, which regulates the supply of the mixture of carbon and calcium oxid. The upper electrode consists of a number of carbons. Fig. 3 shows twelve, but more or less may be employed, according to the size of the furnace. These carbons are all in electrical contact with each other, Figs. 3 and 5, so that they practically form one big carbon. Fig. 3 shows the carbons in contact with their inside portions, while Fig. 5 shows them in contact with each other throughout their whole width. The carbons are two, three, or four inches in diameter, according to the size of the furnace, and are preferably twenty-four inches long. They are held together at their tops by a strong metal casing $b$, preferably made of copper, to which are further connected two metal rods or bars $cc$, Fig. 2, which are also preferably made of copper. The metal rods or bars unite at their top ends and carry there a metal plate $c'$, into which lead the cables $c^2$, which conduct the electrical current from one pole of the electric generator or from a transformer into the upper electrode. The plate $c'$ is provided with a ring $c^3$, which is connected with a ring $c^4$ of insulating material. This ring connects with the chain D. The chain runs over pulleys into the regulating-room, from where the upper electrode is raised or lowered, according to the indications on the electrical measuring instruments.

The iron vessel A, in which the carbid is formed, rests on the iron plate E, which is provided with a narrow metal plate $e$, into which lead the cables from the other pole of the electric generator or from a transformer. The bottom of A is covered with carbid. The circuit is closed by the arc which passes between the carbons and the carbid when the furnace is in operation.

The mixture of carbon and calcium oxid is introduced through the hopper F. The wheel G regulates the supply of the mixture. If the wheel is turned quick, more material will be introduced than if the same is turned slow. The carbid is formed by the heat of the electric arc, and as it accumulates the carbon arrangement is drawn up.

When a block of carbid of sufficient size has been formed, then the current is turned off and the carbon arrangement is raised above A. The vessel A is now taken out and replaced by another one like it. In this way the furnace can be continually used. In order to facilitate the taking out of the vessel A, the plate E is mounted slightly oblique and is provided with two grooves in which slide two ribs, which form part of the bottom of A. A is held in position by the device $e'$.

When $e'$ is released, the vessel A may be easily taken out by means of an iron hook and the ring $a$. It slides out easily in the grooves of plate E.

The carbid on the bottom of the vessel A is put there in order to obtain pure carbid. If carbon is employed in its place, then the lower portion of the carbid block contains uncombined carbon.

The material is introduced inside the carbon arrangement for the purpose of preventing a good deal of the mixture from falling sidewise, where it is not combined. In this way the uncombined crust of the mixture around the carbid block is reduced.

Fig. 4 shows a modification of the carbon arrangement in which an inside carbon is employed. The outside carbons are separated from each other, so that a number of arcs are formed. The carbons are united at their top by a similar metal casing, as described, and the inner carbon is also connected thereto by a metal casing $b'$, with bars which connect with the outer casing, so that it derives current from the same cables as the outside carbons. The top of casing $b'$, Fig. 6, and the tops of its connecting-bars form edges, so that the material falls easily down. The inner carbon is of the same size and diameter as the outside ones.

The furnace is surrounded by brick walls, of which the lower portion only is shown. The wall W is provided with a door $w$, which is closed while the furnace is in operation. The space between the brick walls connects with a chimney, so that gases, chiefly carbon monoxid, which form may escape. The walls are provided with flues. (Not shown on the drawings.)

In the described way a highly-efficient carbid-furnace is provided which produces pure carbid.

Having now described my invention, what I claim therein as new, and desire to secure by Letters Patent, is—

1. In a carbid-furnace, the combination of the upper electrode, a carbid-tank provided with grooves in the bottom thereof, a supporting-plate for said tank arranged at an incline and provided with ribs corresponding to said grooves, a plate attached to said supporting-plate for carrying the current-cables, and carbid placed on the bottom of the tank for forming the surface of the lower electrode, substantially as described.

2. In a carbid-furnace, the combination of an upper carbon electrode, a tank or receptacle forming the lower electrode, a ribbed supporting-plate for said tank to which the current-supply cables are connected, and a carbid coating or covering for said tank or receptacle, substantially as described.

In testimony whereof I have hereunto set my hand in the presence of two subscribing witnesses.

LUDWIG K. BÖHM.

Witnesses:
HENRY B. OAKMAN,
J. F. CARROLL.